(12) United States Patent
Kliner et al.

(10) Patent No.: US 8,027,555 B1
(45) Date of Patent: Sep. 27, 2011

(54) SCALABLE CLADDING MODE STRIPPER DEVICE

(75) Inventors: Dahv Kliner, Mountain View, CA (US); Derek A. Tucker, Santa Clara, CA (US); Juan Lugo, Santa Rosa, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 12/828,021

(22) Filed: Jun. 30, 2010

(51) Int. Cl.
*G02B 6/26* (2006.01)

(52) U.S. Cl. .................................................. 385/29

(58) Field of Classification Search .............. 385/29
See application file for complete search history.

(56) References Cited

U.S. PATENT DOCUMENTS

| | | | | |
|---|---|---|---|---|
| 4,678,273 | A | 7/1987 | Vilhelmsson | 385/128 |
| 5,179,610 | A | 1/1993 | Milburn et al. | 385/92 |
| 5,291,570 | A | 3/1994 | Filgas et al. | 385/78 |
| 5,946,437 | A | 8/1999 | Uchida et al. | 385/77 |
| 6,167,177 | A | 12/2000 | Sandstrom et al. | 385/100 |
| 6,477,295 | B1 | 11/2002 | Lang et al. | 385/31 |
| 6,860,651 | B2 | 3/2005 | DeRosa et al. | 385/92 |
| 6,865,316 | B1 * | 3/2005 | Pratt | 385/29 |
| 6,974,266 | B2 | 12/2005 | Seguin et al. | 385/94 |
| 6,983,096 | B2 * | 1/2006 | Pacheco et al. | 385/140 |
| 6,999,481 | B1 | 2/2006 | Jurgensen | 372/6 |
| 7,010,204 | B2 | 3/2006 | Reith et al. | 385/128 |
| 7,090,411 | B2 | 8/2006 | Brown | 385/92 |
| 7,146,073 | B2 | 12/2006 | Wan | 385/29 |
| 7,215,860 | B2 | 5/2007 | Engelberth et al. | 385/127 |
| 7,306,376 | B2 | 12/2007 | Scerbak et al. | 385/76 |
| 7,349,596 | B2 * | 3/2008 | Anderegg et al. | 385/29 |
| 7,373,070 | B2 | 5/2008 | Wetter et al. | 385/134 |
| 7,406,238 | B2 | 7/2008 | Hokansson et al. | 385/128 |
| 7,437,046 | B2 | 10/2008 | DiGiovanni et al. | 385/128 |
| 7,551,823 | B2 | 6/2009 | Reith et al. | 385/123 |
| 7,580,600 | B1 | 8/2009 | Starodubov et al. | 385/31 |
| 7,609,921 | B2 | 10/2009 | Shimotsu | 385/43 |
| 2007/0206909 | A1 * | 9/2007 | Wetter et al. | 385/92 |
| 2008/0131060 | A1 | 6/2008 | Hu et al. | 385/92 |
| 2009/0080835 | A1 | 3/2009 | Frith | 385/50 |
| 2009/0175301 | A1 | 7/2009 | Li et al. | 372/6 |

OTHER PUBLICATIONS

Alexandre Wetter et al. "High power cladding light strippers", Fiber Lasers V: Technology, Systems, and Applications, edited by Jes Broeng, Clifford Headley, Proc. of SPIE vol. 6873, 687327, (2008).

* cited by examiner

*Primary Examiner* — Michelle R Connelly Cushwa

(74) *Attorney, Agent, or Firm* — Matthew A. Pequignot; Pequignot + Myers LLC

(57) ABSTRACT

A cladding mode stripper for stripping cladding modes from an optical fiber is disclosed. The cladding mode stripper includes a reflective base and a block of a transparent material disposed on the reflective base. The block of the transparent material has a groove in its bottom surface for the fiber. The fiber is thermally coupled to the base and optically coupled to the groove in the block, for example using an index matching gel. The cladding mode light is reflected from the reflective base and is absorbed in a cover enclosing the block. An additional thin block of transparent heat-conductive material can be placed between the fiber and the reflective base, to prevent the index matching gel from contacting the reflective surface of the base.

22 Claims, 4 Drawing Sheets

US 8,027,555 B1

SCALABLE CLADDING MODE STRIPPER DEVICE

TECHNICAL FIELD

The present invention relates to fiberoptic devices, and in particular to cladding mode strippers for stripping cladding modes of light from an optical fiber.

BACKGROUND OF THE INVENTION

Fiber lasers have significant advantages over traditional lasers, including stability of alignment, scalability, and high optical power of a nearly diffraction limited output beam. In a fiber laser, the gain medium is a length of an optical fiber, the core of which is doped with an active lasing material, typically ions of a rare earth element, such as erbium or ytterbium or both. The lasing material is usually pumped using an emission of a diode laser, or an array of diode lasers. The advent of double clad active optical fibers having inner and outer claddings, in which the pump light is coupled to the inner cladding to be absorbed at the doped fiber core along the fiber length, allowed a considerable increase in overall output power of a fiber laser, while preserving the brightness and directivity of a singlemode output laser beam. Power levels of the order of several kilowatts or even tens of kilowatts in an almost singlemode output laser beam are now achievable, opening a great variety of industrial applications, such as concrete drilling or sheet metal cutting for a car industry or shipbuilding.

At high optical power levels of fiber lasers, the task of managing stray light becomes crucial. A doped fused silica core and a fused silica inner cladding or claddings of the fiber lasers are surrounded by an external coating made of a polymer. Having an external polymer coating is essential because without it, the optical fiber becomes very brittle; furthermore, for some fibers called "polymer-clad fibers", the polymer layer functions as an outer optical cladding. At high pump power levels, even a small fraction of stray light can heat the polymer to a temperature at which it can be damaged, causing catastrophic failure of the active fiber of the laser. For instance, in fiber laser arrangements where the fiber is pumped at one end, and a catastrophic thermal failure occurs at the other end, the fiber can actually start burning towards the pump end, causing the entire length of expensive active double-clad fiber to be eliminated.

In fiber lasers, the stray light and associated heating is caused by so called cladding modes, that is, modes of light propagation in the cladding. In double clad fibers, the cladding modes of the inner cladding are used to deliver the pump light to the fiber core. When the light of the cladding modes escapes the inner cladding, it can cause a localized heating of the fiber polymer coating, resulting in a catastrophic failure of the active fiber. Because of this, the cladding modes need to be removed (stripped) from the fiber where they are no longer required, or where they should not be normally present, such as in outer cladding of a double clad fiber. For example, when an active optical fiber is pumped at one end, the residual inner cladding light can be removed at the other end of the fiber to prevent its further propagation. Furthermore, the cladding modes present in the outermost cladding can be removed at the pump end of the active fiber. The cladding light can include the residual (unabsorbed) pump light, amplified spontaneous emission (ASE) of the active fiber core, and the laser light at the wavelength of lasing that escaped the fiber core.

Cladding modes are removed using so called cladding mode stripper devices, or cladding mode strippers. A cladding mode stripper of the prior art has a layer of a high-index material disposed next to and optically coupled to the cladding of the optical fiber. The cladding light present in the cladding is coupled to the high-index material and is absorbed in the high-index material or in an opaque solid shield disposed around the high-index material. An index-matching gel or a coating of a high-index polymer is typically used in a cladding mode stripper. By way of example, Wilhelmson et al. in U.S. Pat. No. 4,678,273, which is incorporated herein by reference, disclose a mode stripper having a radiation-resistant high-index material surrounding the optical fiber.

To facilitate a more uniform distribution of cladding mode light stripped along a length of an optical fiber, the refractive index of the high-index polymer can be made to vary along the fiber. For example, Wetter et al. in an article entitled "High power cladding light strippers", *Photonics West* 2008, *Fiber Lasers V: Technology, Systems, and Applications*, Proc. of SPIE Vol. 6873, 687327, which is incorporated herein by reference, discloses a high-power cladding mode stripper having the refractive index varying along the fiber length. Anderegg et al. in U.S. Pat. No. 7,349,596, which is incorporated herein by reference, disclose a cladding mode stripper device in which a polymer with negative temperature dependence of the refractive index is deposited along the fiber. The negative temperature dependence of the polymer limits the local cladding mode stripping effect when the polymer is locally heated to a high enough temperature. The cladding modes can be stripped off by the cooler part of the coating disposed downstream of the optical fiber; as a result, the "hot spots" in the cladding mode stripper device are avoided and the temperature distribution evens out.

Jürgensen in U.S. Pat. No. 6,999,481, which is incorporated herein by reference, discloses a cladding mode stripper device in which the sheath (the outer coating) is gradually thinned along the fiber so that the cladding modes can escape gradually, thus lowering the peak temperatures. Hu et al. in US Patent Application Publication 2008/0131060 A1, which is incorporated herein by reference, disclose a cladding mode stripper, in which a light-scattering material is deposited on the fiber to scatter the cladding mode light. Furthermore, Frith in US Patent Application Publication 2009/0080835 A1, which is incorporated herein by reference, discloses a "gradual" cladding mode stripper for a multi-cladding fiber, in which the claddings of the fiber are removed one by one in a step-like fashion, the high-index material being placed at the steps where the claddings are removed, to couple the cladding modes out. Disadvantageously, the prior-art approaches are not scalable to very high optical power levels, being specific to particular fiber types and particular optical power ranges.

The prior art lacks a cladding mode stripper device that would be simple yet scalable to high optical power levels. Accordingly, the present invention provides such a device.

SUMMARY OF THE INVENTION

In accordance with the invention there is provided a cladding mode stripper for stripping a cladding mode of an optical fiber having a core and a first cladding, the cladding mode stripper comprising:

a base having a reflective surface for reflecting light of the cladding mode, wherein the optical fiber is disposed proximate to the reflective surface and is thermally coupled thereto for conducting heat away from the optical fiber; and a block of a transparent material, having a first surface disposed on the reflective surface of the base and thermally coupled thereto for conducting heat away from the block, wherein the first surface of the block has a groove for the optical fiber, wherein the first cladding of the optical fiber is optically coupled to the groove for stripping the cladding mode from the first cladding of the optical fiber, and wherein the groove is deep enough not to impose a substantial amount of mechanical stress on the optical fiber once the first surface of the block is disposed on the reflective surface;

wherein a refractive index of the transparent material of the block is equal to or higher than a refractive index of the first cladding of the optical fiber.

In accordance with another aspect of the invention there is further provided a cladding mode stripper for stripping a cladding mode of an optical fiber having a core and a first cladding, the cladding mode stripper comprising:

a base;

a first block of a transparent material, disposed in or on the base and thermally coupled thereto for conducting heat away from the first block, wherein the first block has a first surface;

a second block of a transparent material, having a first surface in a contact with the first surface of the first block, wherein the first surface of the first or the second block has a groove for the optical fiber, wherein the first cladding of the optical fiber is optically coupled to the groove for stripping the cladding mode from the first cladding of the optical fiber; and an opaque cover thermally coupled to the base, for enclosing the first and the second blocks for at least partial blocking of light of the stripped cladding mode.

In accordance with another aspect of the invention there is further provided a method of stripping a cladding mode of an optical fiber having a core and a first cladding, the method comprising:

(a) disposing the optical fiber proximate to a reflective surface of a base for reflecting light of the cladding mode;

(b) thermally coupling the optical fiber to the base for conducting heat away from the optical fiber;

(c) disposing a first surface of a block of a transparent material on the reflective surface of the base and thermally coupling the first surface to the base for conducting heat away from the block, wherein the first surface of the block has a groove for the optical fiber, wherein the groove is deep enough not to impose a substantial amount of mechanical stress on the optical fiber once the first surface of the block is disposed on the reflective surface, and wherein a refractive index of the transparent material of the block is equal to or higher than a refractive index of the first cladding of the optical fiber; and (d) optically coupling the first cladding of the optical fiber to the groove for stripping the cladding mode from the first cladding of the optical fiber.

BRIEF DESCRIPTION OF THE DRAWINGS

Exemplary embodiments will now be described in conjunction with the drawings in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art. In FIGS. 1 to 8, the like numerals refer to the like elements.

Figure 1:
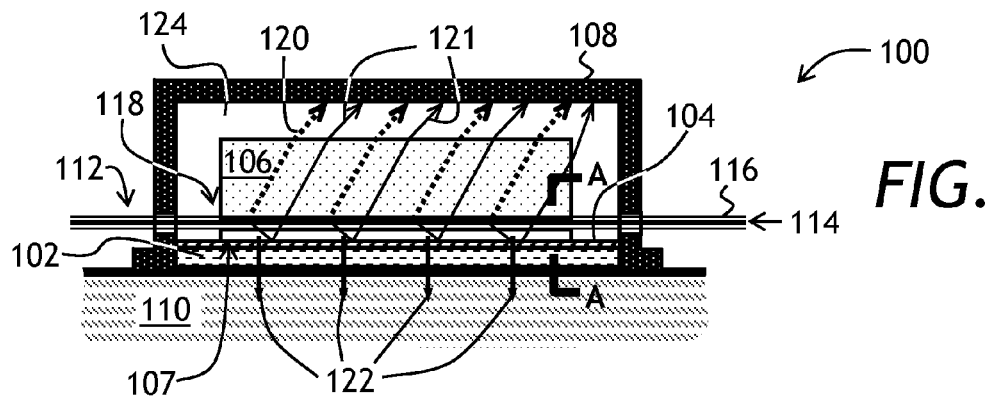
FIG. 1 is a side cross-sectional view of a cladding mode stripper of the invention.
Figure 2:
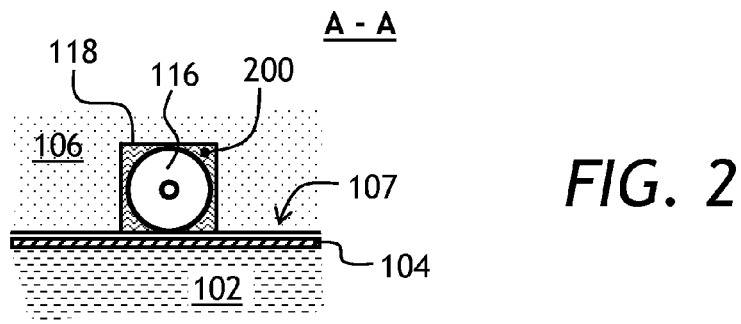
FIG. 2 is a cross-sectional view of a channel region of the cladding mode stripper of FIG. 1, the cross-section being taken along lines A-A in FIG. 1.

Referring to FIGS. 1 and 2, a cladding mode stripper device 100 of the invention is shown. The mode stripper device 100 has a base 102 having a reflective surface 104; a block 106 of a transparent material, disposed on the base 102 and thermally coupled to the base 102 for conducting heat away from the block 106; an optional opaque cover 108 thermally coupled to the base 102 for blocking light of the stripped cladding modes; and an optional heat sink 110 such as a thermoelectric (TEC) cooler, coupled to the base 102 for removing heat from the base 102. A bottom surface 107 of the block 106 is placed on the base 102. A groove 118 is provided in the block 106 extending from the bottom surface 107. The groove 118 is better seen in FIG. 2. An optical fiber 112 having a core 114 and a first cladding 116 is disposed in the groove 118 for the optical fiber 112. The first cladding 116 of the optical fiber 112 is optically coupled to the groove 118 for stripping the cladding modes from the first cladding 116 of the optical fiber 112. The groove 118 has a depth for receiving the optical fiber 112 so as not to impose a substantial amount of mechanical stress on the optical fiber 112, once the bottom surface 107 of the block 106 is disposed on the reflective surface 104 of the base 102. In one embodiment, the groove is deep enough to receive at least 80% of the fiber diameter. To ensure that the cladding mode light is coupled into the block 106, the refractive index of the transparent material of the block 106 is equal to or higher than a refractive index of the first cladding 116 of the optical fiber 112.

In operation, the cladding light couples out of the first cladding 116 of the optical fiber 112 and into the block 106, as shown by dashed arrows 120 and solid arrows 121, the dashed arrows 120 corresponding to the light emitted upwards in FIG. 1, that is, towards the opaque screen 108, and the solid arrows 121 corresponding to the light emitted downwards in FIG. 1, that is, towards the reflective surface 104. Upon reflecting from the reflective surface 104, the light 121 propagates upwards, towards the screen 108, as the solid arrows 121 illustrate; and the screen 108 absorbs the cladding light 121.

Advantageously, the optical fiber 112 is disposed proximate to, and in thermal contact with, the reflective surface 104 of the base 102. As a result of the proximity to the reflective base 102 and a good thermal contact with the reflective base 102, the fiber 112 is prevented from overheating because the heat is effectively transferred from the fiber 112 to the base 102 and to the heat sink 110, as schematically shown by black arrows 122. Therefore, in the cladding mode stripping device 100, good heat-sinking of the optical fiber 112 due to proximity to the base 102 is uniquely combined with effective stray light management due to reflective surface 104 of the base 102. The good thermal contact results in a temperature increase of the fiber 112 of less than 0.1° C. per every Watt of stripped optical power.

In one embodiment of the invention, an air gap 124 is provided between the block 106 and the opaque cover 108, for lessening thermal coupling between the block 106 and the opaque cover 108. Thus, the heat generated as a result of absorbing cladding modes light 120 and 121 does not get transferred to the fiber 112, being transferred directly to the base 102. The heat sink 110 and the base 102 can be combined into a single element, and/or the cover 108 can be connected directly to the heat sink 110. In FIG. 1, the cover 108 is shown physically and thermally connected to both the heat sink 110 and the base 102.

One advantage of the cladding mode stripper 100 as compared to the prior art devices is that it is scalable to high optical power levels of the cladding modes. The power handling capability of the cladding mode stripper 100 depends on the overall dimensions of the block 106 and the base 102, as well as the length of the groove 118. By scaling up these dimensions, very high power handling capability can be achieved. It has been experimentally demonstrated that a prototype of the cladding mode stripper 100 is capable of handling at least 150 W of stripped optical power.

Referring to FIG. 2, a region of the channel 118 of the mode stripper device 100 is shown in a cross-sectional view. The cross-section is taken along lines A-A in FIG. 1. A layer 200 of an index-matching fluid or a gel is disposed in the groove 118 at least partially surrounding the optical fiber 112 for improving the optical coupling between the first cladding 116 of the optical fiber 112 and the groove 118 of the block 106. In addition, the layer 200 functions to improve thermal coupling between the fiber 112 and the base 102. The layer 200 can include a silicone, an acrylate, or a sol-gel material.

The block 106 can be made of a transparent material with a thermal conductivity of preferably better than 0.5 W/(m*K). Sapphire is an excellent material for this application due to its high thermal conductivity of greater than 20 W/(m*K), high transparency, and excellent mechanical properties. The block 106 can be also made partially absorbing, in which case yttrium aluminum garnet (YAG) material may be appropriate. Alternatively, the block 106 can be made of an optical ceramic material, such as a ceramic YAG. Preferably, the block 106 has a shape of a rectangular parallelepiped. Other shapes can of course be used.

In FIG. 2, the groove 118 is shown as having a rectangular cross section. The groove 118 can also have a cross section of a different shape, such as cylindrical or polygonal cross section. Furthermore, to improve the stripping of low numerical aperture (NA) cladding modes, the groove 118 can be made to include a section curved in a plane of the bottom surface 107 of the block 106 to enable the fiber 112 to be laid out in the groove 118 with a slight bend. An example of such a groove will be shown below.

The optical fiber 112 can be a double clad or a multiclad optical fiber having a second cladding, not shown, disposed around the first cladding 116. In this case, the second cladding of the optical fiber 112 can be at least partially removed along a length of the optical fiber 112 disposed in the groove 118, so as to optically couple the first cladding 116 to the groove 118. The optical fiber 112 can be an active optical fiber, that is a fiber having a core doped with an amplifying material. The optical fiber 112 can be a singlemode or a multimode fiber. When it is the cladding mode light in the second cladding that needs to be stripped, the second cladding need not be removed.

Figure 3:
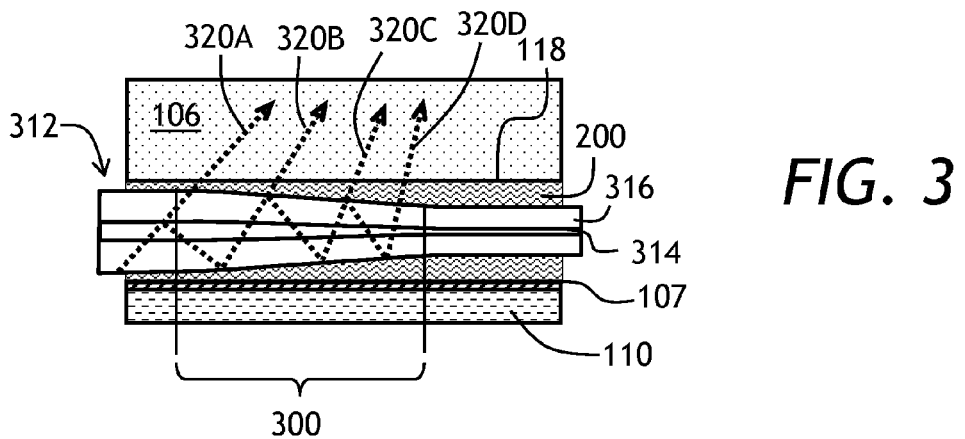
FIG. 3 is a cross-sectional view of one embodiment of the channel region, taken along the channel.

The optical fiber 112 also can be tapered to improve cladding mode stripping performance of the cladding mode stripper 100. Referring now to FIG. 3, a longitudinal cross-sectional view of a region of the channel 118 is shown. A fiber 312 having a core 314 surrounded by a cladding 316 is tapered along a fraction 300 of its length. As a result of the tapering of the fiber 312, an angle, which cladding beams 320A to 320D form with the core 314, increases in going from the beam 320A to the beam 320D. The increased angle, as seen in FIG. 3, facilitates cladding modes removal along the entire tapered section 300.

Figure 4:
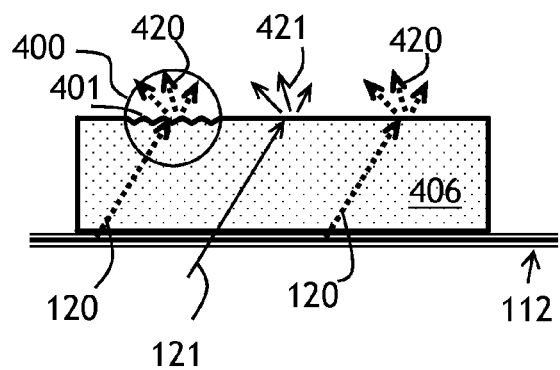
FIG. 4 is a cross-sectional view of a block of a transparent material having a grooved surface.

Turning to FIG. 4, a cross-sectional view of a block 406 is shown. The block 406 corresponds to the block 106 of the cladding mode stripper 100 of FIG. 1 and serves the same purpose as the block 106. The difference between the blocks 406 and 106 is that the block 406 has a grooved surface 401, shown in a magnified insert 400, for scattering the light beams 120 and 121 of the stripped cladding modes, as shown schematically with arrows 420 and 421, respectively. The scattering prevents the beams 120 and 121 from reflecting from outer faces of the block 406 back into the block 406 and forming "hot spots" or re-entering the optical fiber 112. Instead of forming the grooves, the surface 401 can be roughened to a "milky" appearance, for the same purpose.

Figure 5:
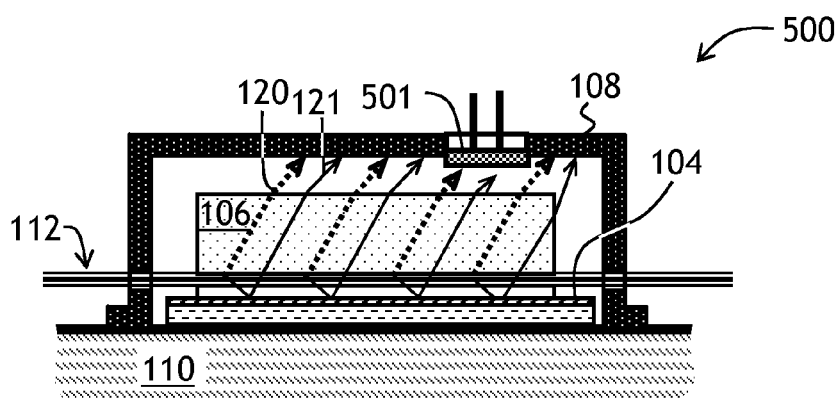
FIG. 5 is a side cross-sectional view of a cladding mode stripper having a light sensor for sensing the stripped light.

Referring now to FIG. 5, a cladding mode stripper device 500 is shown in a side cross-sectional view. The cladding mode stripper device 500 has a light sensor 501 mounted in the screen 108 disposed in a suitable location for sensing the optical power of the stripped light beams 120, 121. The optical power of the stripped light measured by the light sensor 501 can be used for controlling purposes, for example to ensure that the stripped optical power does not exceed a pre-determined level.

Figure 6:
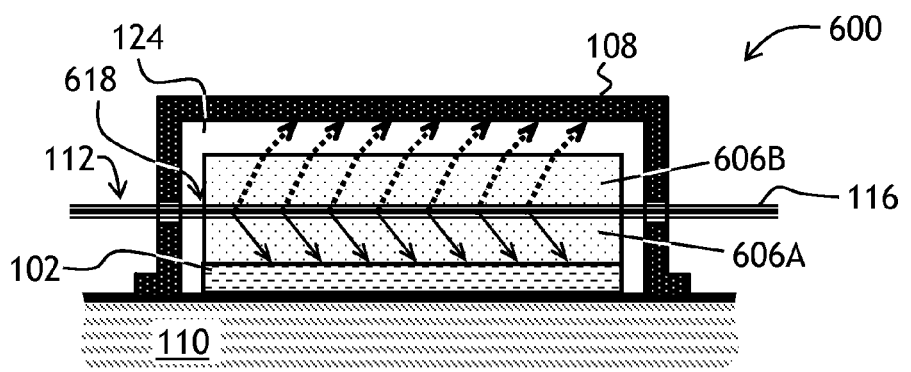
FIG. 6 is a side cross-sectional view of another embodiment of a cladding mode stripper of the invention.

Turning to FIG. 6, a cladding mode stripper device 600 is shown in a side cross-sectional view. The cladding mode stripper device 600 differs from the cladding mode stripper 100 in that it has two blocks 606A and 606B of instead of one block 106. The first block 606A is disposed on the base 102 and is thermally coupled to the base 102 for conducting heat away from the first block 606A. The first block 606A contacts the second block 606B. One or both of the joined surfaces of the first and the second blocks 606A and 606B have a groove 618 for the optical fiber 112. The first cladding 116 of the optical fiber 112 is optically coupled to the groove 618 for stripping the cladding mode light from the first cladding 116 of the optical fiber 112. Preferably, the joined surfaces of the first and the second blocks 606A and 606B are thermally and optically coupled to each other, for conducting heat and light away from the optical fiber 112. Further, preferably, the air gap 124 is left between the second block 606B and the opaque cover 108, for lessening thermal coupling between the second block 606B and the opaque cover 108.

Advantageously, the first block 606A provides a barrier between the index matching gel 200 and the base 102. To ensure that the heat from the fiber 112 is effectively transferred through the first block 606A to the base 102, the first block 606A can be manufactured from a material having a high thermal conductivity, such as sapphire; also for effective heat transfer, the first block 606A can be made as thin as can be reasonably manufactured. By way of example, if the first block 606A is made of sapphire, it can be made as thin as 1 mm, although a thickness of 2 mm is more practical. On the other hand, increasing the thickness of the first block 606A helps one to avoid formation of hot spots because the light diverges more from the fiber 112 when the thickness is increased. One practical range of thickness of the first block 606A is between 1 mm and 25 mm.

In one embodiment, the base 102 is reflective, but the cladding mode stripper 600 will work even when the base 102 is not reflective, or is partially reflective. When the base 102 is not 100% reflective, for example 75% reflective or less, more light energy is directed towards the heat sink 110, which may be desirable in certain cases.

Figure 7:
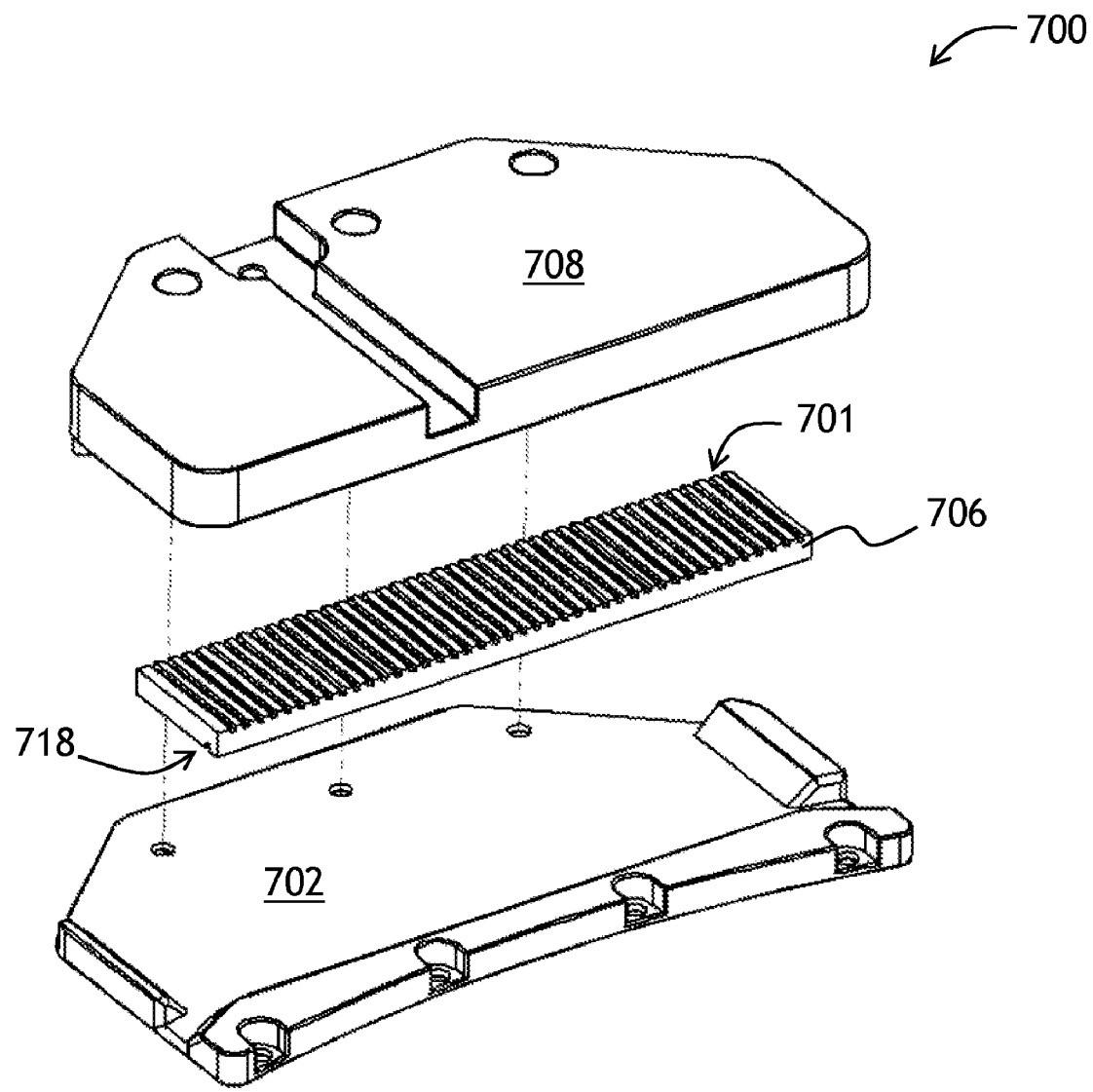
FIG. 7 is an exploded view of a prototype of the cladding mode stripper of FIG. 1.

Referring now to FIG. 7, an exploded view of a prototype of a cladding mode stripper 700 is shown. The cladding mode stripper 700 is similar to the cladding mode stripper 100. The cladding mode stripper 700 has a reflective base 702, a glass block 706, and an opaque cover 708. The reflective base 702 and the opaque cover 708 are attached to a heat sink, not shown. The glass block 706 has a curved groove 718 on its bottom surface for the fiber, not shown. An upper surface 701 of the glass block 706 is grooved, similarly to the grooved surface 401 of the glass block 406 in FIG. 4.

Figure 8:
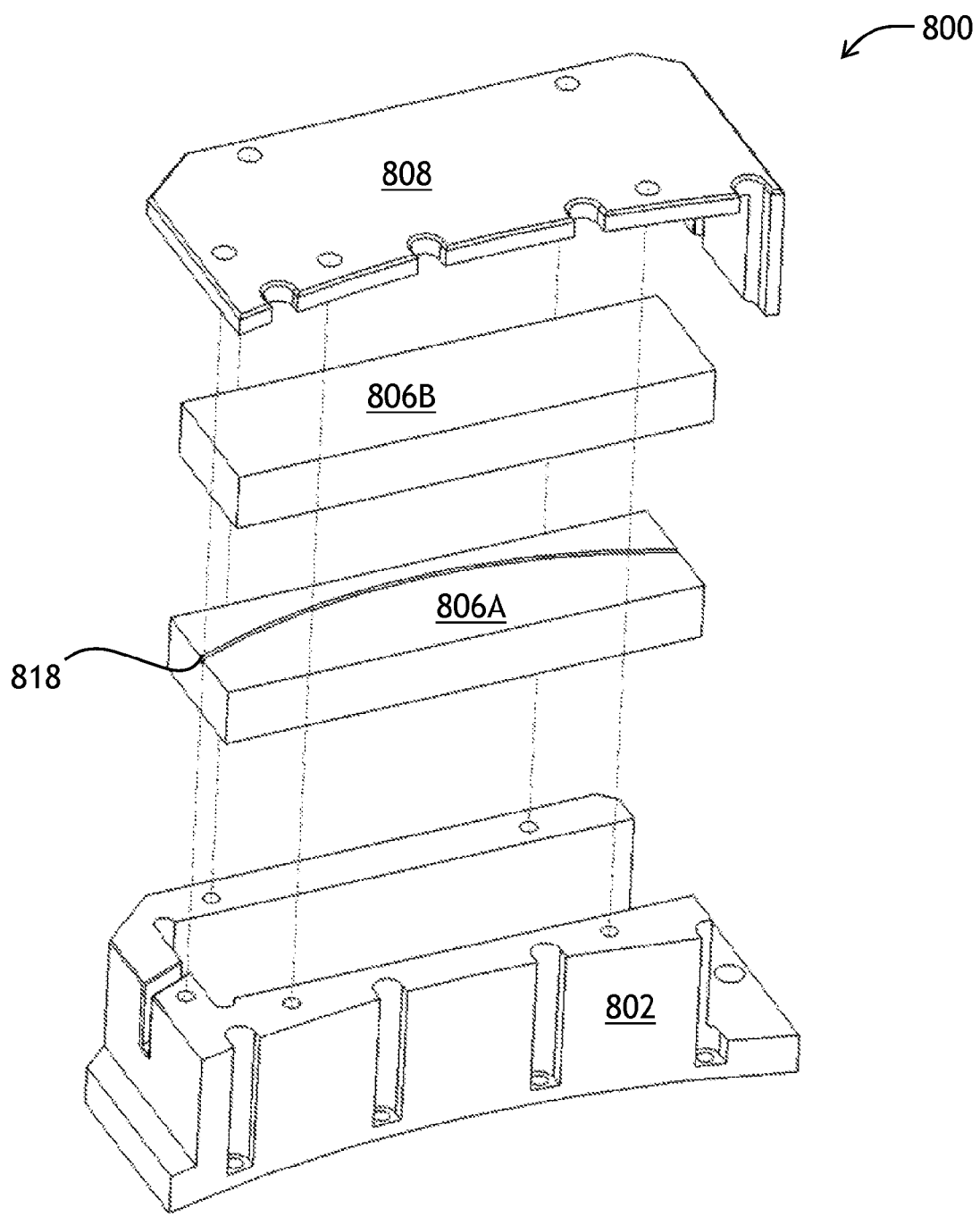
FIG. 8 is an exploded view of a prototype of the cladding mode stripper of FIG. 6.

Turning to FIG. 8, an exploded view of a prototype of a cladding mode stripper 800 is shown. The cladding mode stripper 700 is similar to the cladding mode stripper 400. The cladding mode stripper 800 has a base 802, two glass blocks 806A and 806B, and an opaque cover 808. The opaque cover 808 is attached to the base 802 enclosing the glass blocks 806A and 806B. The bottom glass block 806A has a curved groove 818 on its top surface for the fiber, not shown.

According to the present invention, a general method of stripping a cladding mode of the optical fiber 112 includes the following steps:
(a) disposing the optical fiber 112 proximate to the reflective surface 104 of the base 102 for reflecting light of the cladding mode;
(b) thermally coupling the optical fiber 112 to the base 102 for conducting heat away from the optical fiber 112;
(c) disposing the bottom surface 107 of the block 106 of a transparent material on the reflective surface 104 of the base 102 and thermally coupling the bottom surface 107 to the base 102 for conducting heat away from the block 106; and
(d) optically coupling the first cladding 116 of the optical fiber 112 to the groove 118 for stripping the cladding mode from the first cladding 116 of the optical fiber 112.
Preferably, the method also includes the following steps:
e) disposing the opaque cover 108 for enclosing the block 106 for at least partial blocking the light of the stripped cladding mode; and
f) thermally coupling the opaque cover 108 to the base 102 (or to the heat sink 110) for conducting heat away from the opaque cover 108, generated as a result of blocking light in step (e). Further, preferably, in step (e), the opaque cover 108 is disposed so as to leave the air gap 124 between the block 106 and the opaque cover 108, for lessening thermal coupling between the block 106 and the opaque cover 108.

The cladding mode strippers 100, 500, 600, 700, and 800 of the invention, as well as the methods of the invention, can be used to strip cladding modes in fiber lasers, fiber amplifiers, in fiber delivery systems such as delivery fibers for high-power diode lasers or diode laser arrays, and in other systems where cladding mode management is required.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A cladding mode stripper for stripping a cladding mode of an optical fiber having a core and a first cladding, the cladding mode stripper comprising:
a base having a reflective surface for reflecting light of the cladding mode, wherein the optical fiber is disposed along and proximate to the reflective surface and is thermally coupled thereto for conducting heat away from the optical fiber; and
a block of a transparent material, having a first surface disposed on the reflective surface of the base and thermally coupled thereto for conducting heat away from the block,
wherein the first surface of the block has a groove for receiving the optical fiber,
wherein the first cladding of the optical fiber is optically coupled to the groove for stripping the cladding mode from the first cladding of the optical fiber, and
wherein the groove is deep enough not to impose a substantial amount of mechanical stress on the optical fiber once the first surface of the block is disposed on the reflective surface;
wherein a refractive index of the transparent material of the block is equal to or higher than a refractive index of the first cladding of the optical fiber.

2. The cladding mode stripper of claim 1, further comprising an opaque cover thermally coupled to the base, for enclosing the block for at least partial blocking the light of the stripped cladding mode.

3. The cladding mode stripper of claim 2, further comprising an air gap between the block and the opaque cover, for lessening thermal coupling between the block and the opaque cover.

4. The cladding mode stripper of claim 1, wherein the block has a roughened or a grooved surface for scattering the light of the stripped cladding mode.

5. The cladding mode stripper of claim 1, wherein the transparent material of the block is selected from the group consisting of sapphire, yttrium aluminum garnet, and an optical ceramic.

6. The cladding mode stripper of claim 1, wherein the groove has a depth to receive at least 80% of a diameter of the optical fiber.

7. The cladding mode stripper of claim 1, wherein the groove includes a section curved in a plane of the first surface, to facilitate stripping of the cladding mode.

8. The cladding mode stripper of claim 1, wherein the optical fiber further comprises a second cladding disposed around the first cladding, wherein the second cladding of the optical fiber is at least partially removed along a length of the optical fiber disposed in the groove, so as to optically couple the first cladding to the groove.

9. The cladding mode stripper of claim 1, further comprising a heat sink coupled to the base for removing heat therefrom.

10. The cladding mode stripper of claim 1, further comprising an index-matching layer disposed between the groove and the optical fiber, to facilitate stripping of the cladding mode.

11. The cladding mode stripper of claim 10, wherein the index-matching layer is selected from the group consisting of a silicone, an acrylate, and a sol-gel material.

12. The cladding mode stripper of claim 1, further comprising the optical fiber, wherein the optical fiber includes a tapered section disposed in the groove, to facilitate gradual stripping of the cladding mode along the tapered section.

13. The cladding mode stripper of claim 1, further comprising the optical fiber, wherein the optical fiber includes an active optical fiber.

14. The cladding mode stripper of claim 1, further comprising an optical sensor disposed to sense an amount of light of the stripped mode.

15. A cladding mode stripper for stripping a cladding mode of an optical fiber having a core and a first cladding, the cladding mode stripper comprising:
   a base;
   a first block of a transparent material, disposed in or on the base and thermally coupled thereto for conducting heat away from the first block, wherein the first block has a first surface;
   a second block of a transparent material, having a first surface in a contact with the first surface of the first block,
      wherein at least one of the first and the second block has a groove disposed in the plane of the first surface thereof for receiving the optical fiber, wherein the first cladding of the optical fiber is optically coupled to the groove for stripping the cladding mode from the first cladding of the optical fiber; and
   an opaque cover thermally coupled to the base, for enclosing the first and the second blocks for at least partial blocking of light of the stripped cladding mode.

16. The cladding mode stripper of claim 15, wherein the first surfaces of the first and the second blocks are thermally and optically coupled to each other, for conducting heat and light away from the optical fiber.

17. The cladding mode stripper of claim 15, further comprising an air gap between the first or the second block and the opaque cover, for lessening thermal coupling between the first or the second block and the opaque cover.

18. The cladding mode stripper of claim 15, wherein a thickness of the first block is between 1 mm and 25 mm.

19. A method of stripping a cladding mode of an optical fiber having a core and a first cladding, the method comprising:
   (a) disposing the optical fiber along and proximate to a reflective surface of a base for reflecting light of the cladding mode;
   (b) thermally coupling the optical fiber to the base for conducting heat away from the optical fiber;
   (c) disposing a first surface of a block of a transparent material on the reflective surface of the base and thermally coupling the first surface to the base for conducting heat away from the block,
      wherein the first surface of the block has a groove for the optical fiber,
      wherein the groove is deep enough not to impose a substantial amount of mechanical stress on the optical fiber once the first surface of the block is disposed on the reflective surface, and
      wherein a refractive index of the transparent material of the block is equal to or higher than a refractive index of the first cladding of the optical fiber; and
   (d) optically coupling the first cladding of the optical fiber to the groove for stripping the cladding mode from the first cladding of the optical fiber.

20. The method of claim 19, further comprising
   (e) disposing an opaque cover for enclosing the block for at least partial blocking the light of the stripped cladding mode; and
   (f) thermally coupling the opaque cover to the base for conducting heat away from the opaque cover, wherein the heat is generated as a result of blocking the light in step (e).

21. The method of claim 20, wherein in step (e), the opaque cover is disposed so as to leave an air gap between the block and the opaque cover, for lessening thermal coupling between the block and the opaque cover.

22. The method of claim 19, further comprising roughening, or providing grooves in the block of transparent material, for scattering the light of the stripped cladding mode.

\* \* \* \* \*